United States Patent [19]
Krieger et al.

[11] Patent Number: 6,118,633
[45] Date of Patent: *Sep. 12, 2000

[54] PLASTIC DISK WITH HUB AND DISK DRIVE FOR USING SAME

[75] Inventors: George T. Krieger, Carmel; James D. Fahey, Farmington, both of Calif.

[73] Assignee: Iomega Corporation, Roy, Utah

[*] Notice: This patent issued on a continued prosecution application filed under 37 CFR 1.53(d), and is subject to the twenty year patent term provisions of 35 U.S.C. 154(a)(2).

[21] Appl. No.: 08/877,631

[22] Filed: Jun. 20, 1997

[51] Int. Cl.$^7$ .............................. G11B 3/70; G11B 5/82
[52] U.S. Cl. ........................................... 360/135; 369/282
[58] Field of Search ........................... 369/282; 360/135, 360/99.12, 99.05

[56] References Cited

U.S. PATENT DOCUMENTS

| | | | |
|---|---|---|---|
| 832,403 | 10/1906 | Milans | 369/282 |
| 1,755,743 | 4/1930 | Morrison | 369/282 |
| 3,430,966 | 3/1969 | Gregg | 274/42 |
| 4,351,047 | 9/1982 | Redlich et al. | 369/270 |
| 4,618,900 | 10/1986 | Saito | 360/97 |
| 4,710,913 | 12/1987 | Matsushima et al. | 369/280 |
| 4,827,470 | 5/1989 | Odawara et al. | 369/282 |
| 4,911,968 | 3/1990 | Higasihara et al. | 369/282 |
| 5,010,435 | 4/1991 | Shiba et al. | 360/133 |
| 5,265,086 | 11/1993 | Ota et al. | 369/284 |
| 5,273,598 | 12/1993 | Higasihara et al. | 156/102 |
| 5,303,098 | 4/1994 | Yamamori et al. | 360/99.12 |

FOREIGN PATENT DOCUMENTS

| | | |
|---|---|---|
| 0 335 465 A2 | 10/1989 | European Pat. Off. . |
| 0 499 413 A1 | 8/1992 | European Pat. Off. . |
| 822729 | 11/1951 | Germany . |
| 479112 | of 1953 | Italy . |
| 60-237672 | 11/1985 | Japan . |
| 2-130722 | 5/1990 | Japan . |
| 2-183479 | 7/1990 | Japan . |
| 2-260184 | 10/1990 | Japan . |
| 4-042446 | 2/1992 | Japan . |

OTHER PUBLICATIONS

"Low Profile Friction Hub", *Research Disclosure*, Dec. 1989, No. 308, p. 958.

*Primary Examiner*—William Klimowicz
*Attorney, Agent, or Firm*—Woodcock Washburn Kurtz Mackiewicz & Norris LLP

[57] ABSTRACT

A plastic disc for storing digital information is disclosed. The disc comprises a plastic platter that is integrally formed concentrically around a metal portion. The disc may have an inner plastic portion located on an inside rim of the metal portion. Preferably, the metal portion has a flange on its rim surface to enhance bonding with the plastic. In another embodiment, the disc may be formed entirely of plastic, and include a clip for attaching the disk to a spindle motor. A disc drive that cooperates with the disc devices, and a method of forming discs is also disclosed.

8 Claims, 3 Drawing Sheets

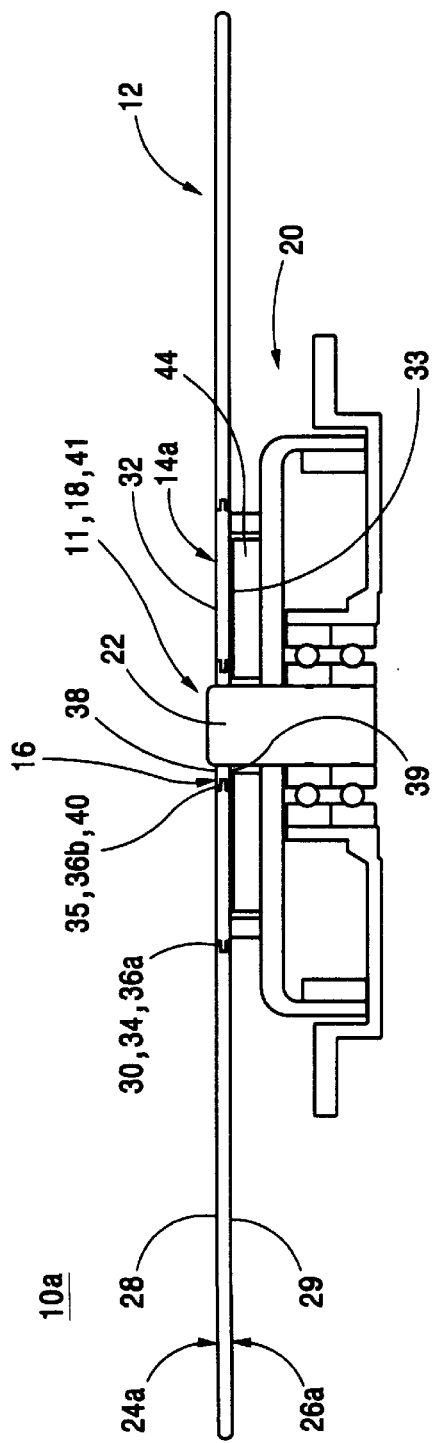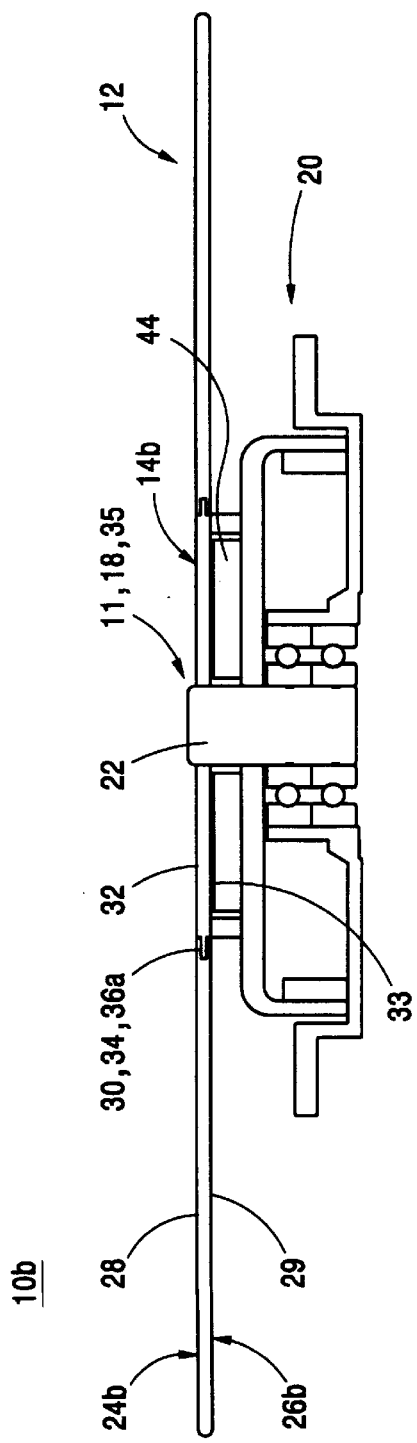

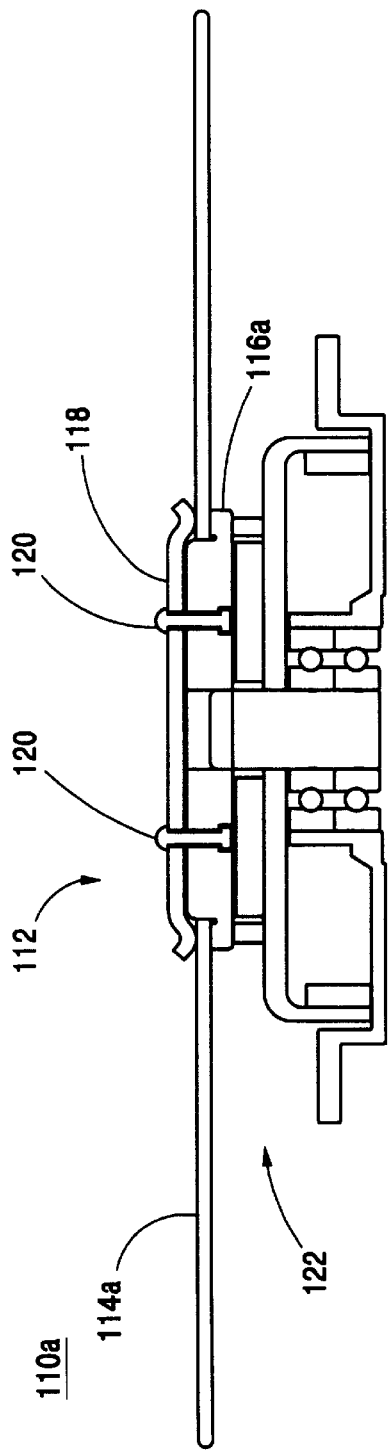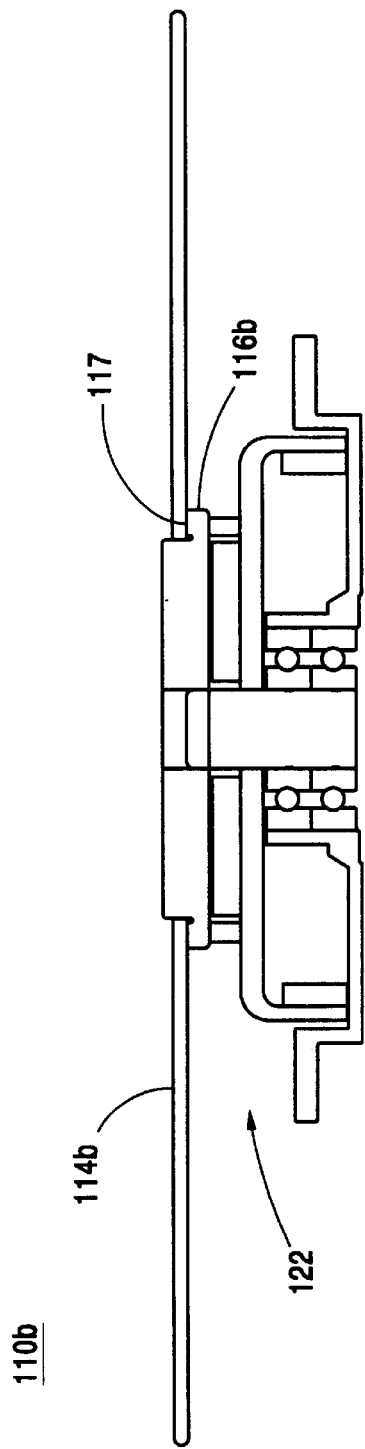
FIG. 5
Prior Art
FIG. 6
Prior Art

PLASTIC DISK WITH HUB AND DISK DRIVE FOR USING SAME

FIELD OF THE INVENTION

This invention relates to reading and recording digital information, and more particularly, to disk drive devices.

BACKGROUND

Disc drives that read and record digital information on a disc-shaped information storage medium are in wide-spread use. Such discs include compact discs (CDs), read-only-memory compact discs (CD-ROMs), rigid magnetic discs, and flexible magnetic disks. Rigid magnetic discs include both fixed discs and removable disks that are housed in cartridges. An example of a removable cartridge having a rigid disc is the JAZ™ cartridge and an example of a removable cartridge having a flexible magnetic disk is a ZIP™ cartridge, both of which are produced by the assignee of the present invention, Iomega Corporation, Roy, Utah.

FIG. 5 (prior art) illustrates a conventional rigid disk 110a that includes hub assembly 112 and platter 114a. Hub assembly 112 includes a metallic hub 116a, a clamp 118, and multiple rivets 120. Platter 114a is held between surfaces of the clamp 118 and hub 116, which are held together by rivets 120. Unfortunately, rivets 120 may cause distortion of platter 114a because of dimensional imperfection or dis-uniformity in producing or assembling the components. Even if the components are produced with tight manufacturing and assembly tolerances, platter distortion may still be a problem because of the sensitivity of the reading and recording process to such distortion. Specifically, distortion of platter 114a as small as an order of magnitude of $1.0 \times 10^{-6}$ inch may cause interruption of the reading and recording process. The industry trend toward increasing a real density of stored information will likely diminish the acceptable amount of distortion.

Furthermore, platter 114a may slip with respect to hub 116a upon shock to disk 110. Such slip may cause the center of platter 114 to be misaligned with the center of spindle motor 122a, which leads to difficulty in track following by the heads. Although removable cartridges are naturally more prone to shocks that may cause such slip, fixed disks (not shown) may also be subject to such shock, especially during shipping and installation. Moreover, the tight tolerances and several steps required to produce hub assembly 112 result in high cost of discs. Users of information storage discs are sensitive to cost and the industry is cost competitive.

FIG. 6 (prior art) illustrates another conventional disk assembly 110b that includes a platter 114b and a hub 116b. Platter 114b is affixed to a mating surface 117 of hub 116b by an adhesive. Not only does using adhesive have the disadvantages of platter 110a discussed above, but using adhesives causes additional difficulty in the assembly process. For example, adhesives can outgass and deposit back onto the discs in the drive and cause head stiction and flying height problems. Moreover, imprecise or dis-uniform application of the adhesive may weaken the joint and the adhesive may inadvertently be spilled or splattered onto the information-bearing surface, which may interrupt reading and recording information or damage the heads. The disadvantages of disc assemblies 110a and 110b described herein apply to both rigid and flexible discs, and to fixed and replaceable discs.

It is desirable to provide a disc assembly, and associated disc drive, that diminishes slipping of the platter if subject to shock, that holds the platter uniformly around its inner circumference to eliminate localized distortion near clamp rivets, and that is less costly and more easily produced without extraordinarily tight tolerances of the components.

SUMMARY OF THE INVENTION

Data storage discs that are simple to produce, that eliminate or diminish slippage when subjected to shock, and that eliminate distortion from fasteners are provided. In a first embodiment of the present invention, a disc includes three separate, concentric segments. The outermost segment is a plastic platter, the middle segment is a metal portion, and the innermost segment is an inner plastic portion. Preferably, the platter, metal portion, and inner plastic portion are mutually co-planer to form a flat disc surface. The metal portion is formed integral with the surrounding plastic portions. The term "integral" when used with the word "formed" in this specification and the appended claims refers to forming the plastic portions directly onto the metal portion, preferably in a thermal or a thermoplastic process.

Preferably, the metal portion has a flange formed around its rim surface where the metal portion mates to the plastic. The flange provides reinforcement and improves the bond and the strength of the interface between the metal and the plastic. The inner plastic portion forms a center aperture that forms a spindle-receiving means of the disc. A spindle of a spindle motor is inserted into the spindle-receiving means when the drive engages the disk.

A second embodiment of the present invention is similar to the first embodiment, except the inner plastic portion is omitted. An inner rim surface of the metal portion forms the aperture for receiving the spindle. In this embodiment, the inner rim surface of the metal portion is substantially cylindrical and lacks a flange.

In a third embodiment of the present invention, a disk is formed of plastic that has a center aperture. An inner rim surface of the disc has a v-shaped protrusion around the circumference of the aperture. The spindle has a corresponding v-shaped notch that mates with the v-shaped protrusion on the disc. Alternatively, the clip may be permanently attached to the disc and the underside of the clip may form a cylindrical cap. The cylindrical spindle may be inserted into the cap to engage the spindle motor to the disc.

BRIEF DESCRIPTION OF THE DRAWINGS

FIG. 1 is a view of a disc assembly according to a first embodiment of the present invention, shown mounted to a corresponding spindle motor of a disc drive;

FIG. 2 is a view of a disc assembly according to a second embodiment of the present invention;

FIG. 5 (Prior Art) and FIG. 6 (Prior Art) each are a view of a conventional disc assembly.

DESCRIPTION OF THE PREFERRED EMBODIMENTS

Figure 3:
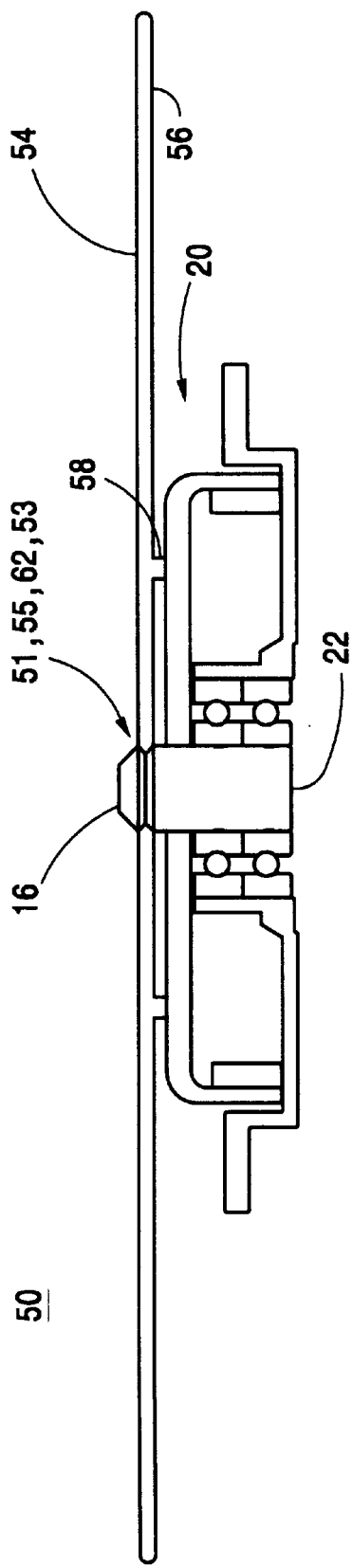
FIG. 3 is a view of a disc assembly and a corresponding spindle motor of a disc drive, according to another embodiment and another aspect of the present invention.

The present invention encompasses an information storage disk, a method of producing the information storage disk, and a corresponding disk drive.

Referring to FIG. 1, a first embodiment of a disk 10a according to the present invention is shown. Disk 10a comprises a platter 12, a metal insert 14a, and an inner plastic portion 16, that are arranged concentrically around a disk center aperture 11 formed in inner portion 16. Disk center aperture 11 forms a spindle-receiving means 18 of disk 10a. Disk 10a has a top portion 24a and a bottom portion 26a. Top portion 24a is formed by a platter top surface 28, an insert top surface 32, and an inner portion top surface 38. Disk bottom surface 26a is formed by platter bottom surface 29, insert bottom surface 33, and inner portion bottom surface 39. Preferably, surfaces 28, 32 and 38 are coplanar and surfaces 29, 33 and 39 are coplanar.

Platter 12 has an inner rim surface 30 that mates to an outer rim surface 34 of insert 14a. Similarly, insert 14a has an inner rim surface 35 that mates to an outer rim surface 40 of inner portion 16. Preferably, insert 14a has protrusions both on outer rim surface 34 and inner rim surface 35 that mate to corresponding surfaces on the platter 12 inner rim surface 30 and the inner portion 16 outer rim surface 40. Preferably, these protrusions form flanges 36a and 36b, respectively.

Spindle motor 20 includes a spindle shaft 22 and clamp magnets 44. The disk drive, of which spindle motor 20 is a part, also includes one or more conventional transducers (not shown) and an actuator (not shown) that moves the transducers into engagement with disc 10a. Co-pending U.S. application Ser. No. 08/835,437, filed Apr. 9, 1997, entitled, "A Shutterless Data Recording Cartridge and Drive for Using Same" (Attorney Docket No. IOM-9317) and co-pending U.S. application Ser. No. 08/833,781, filed Apr. 9, 1997, entitled, "A Disc Hub for a Removable Cartridge and Spindle Motor for Using Same" (Attorney Docket No. IOM-9415), now U.S. Pat. No. 5,798,88, describe a disc drive and a spindle motor, respectively, of the type that may employ the present invention. Both of these patent applications are incorporated herein by reference in their entirely.

Referring to FIG. 2, which illustrates a second embodiment of the present invention, disk 10b includes a platter 12 and a metal insert 14b that forms a center aperture 11 therein, which defines the spindle-receiving means 18. Disk 10b includes a top surface 24b and a bottom surface 26b. Top surface 24b is formed by a platter top surface 28 and a insert top surface 32. Disk bottom surface 26b is formed by a platter bottom surface 29 and a insert bottom surface 33. Preferably, platter top surface 28 and insert top surface 32 are coplanar, and platter bottom surface 29 and insert bottom surface 33 are coplanar. As in the first embodiment, metal insert 14b includes a protrusion on an insert outer rim surface 34 that mates with a platter inner rim surface 30. Preferably, the protrusion forms an outer rim flange 36a. Insert 32 forms an inner rim surface 35, which forms a center aperture 11 that is the spindle-receiving means 18 of disk 10b. The present invention encompasses protrusions in other shapes, including for example fins, spires, pins, ribs, and the like. Spindle motor 20, spindle 22, and clamp magnets 44 are as described above in the first embodiment.

Although the metal portion 14a,b preferably has a thickness that is substantially the same as a thickness of the surrounding plastic portion, the present invention is not limited thereto. Rather, the present invention encompasses a metal insert having other shapes and thickness. For example, a metal insert may be encapsulated by surrounding plastic because the insert is thinner than the disc, and a metal insert may comprise a thin sheet of metal that is stamped or glued to a plastic disc.

Referring to FIG. 3, a disk 50 is formed of plastic and preferably lacks metal. Disk 50 includes a top surface 54, an inner rim surface 55, a bottom surface 56, and spacer members 58 disposed on bottom surface 56. Disk inner rim surface 55, which is disposed between edges of top surface 54 and bottom surface 56, forms a center aperture 51. Preferably, inner rim surface 55 has a v-shaped protrusion 53 disposed thereon. Spindle motor 20 includes a spindle 22 and a spindle clip 60 that is disposed on a distal end of spindle 22. Preferably, spindle clip 60 has a v-shaped notch 62 disposed around the circumference of spindle clip 60. Notch 62 is designed to mate with v-shaped protrusion 53 of disk 50, thereby forming spindle-receiving means 18. Alternatively, the present invention encompasses spindle clip 60 being permanently attached to disk 50, thereby forming a cylindrical cap 60 into which spindle 22 may be inserted. An interior surface of cylindrical cap 60 forms a circular mating surface that forms spindle-receiving porion 18. Disk 50 is formed without metal so as to enable attachment of disk 50 to spindle motor 20 without the use of clamp magnets 44. Space members 58 position disc 50 onto a top portion of spindle motor 20.

The plastic components described herein are preferably formed of a substrate of polyethylene terephthalate ("PET") or polyethylene naphthalate ("PEN") that is coated with a magnetic layer. However, any material that is capable of forming a suitable substrate may be used. The present invention encompasses both fixed and removable discs. The metal portion 14a,b comprises a ferrous metal, which encompasses any metal having suitable magnetic properties, preferably a low carbon steel or iron.

The present invention encompasses a disc drive that cooperates with disc 50, including spindle motor 20, a transducer (not shown) capable of reading and recording digital information stored on disk 50, and an actuator (not shown) capable of positioning the transducer. The spindle motor 20 is as described above in reference to disc 50, and may be employed with a transducer and actuator that will be apparent to those familiar with such devices.

In operation according to the first and second embodiments, the spindle 22 is inserted into spindle-receiving means 18 of disk 10a,b. Clamp magnets 44 chuck metal portion 14a,b to spindle motor 20 to urge the disc to rotate therewith. In operation according to the third embodiment, spindle shaft 22 is inserted into spindle-receiving means 18 of disc 50 until the v-shaped protrusion 53 clips into the corresponding notch 62 disposed on spindle clip 60. Alternatively, in the case in which spindle clip 60 is affixed to disc 50, spindle member 22 inserts into clip 60. The spindle 22 imparts rotation to disc 50 at least partially because of contact between disc 50 and clip 60, or in the alternative arrangement, between clip 60 and spindle 22. Conventional methods may be employed for augmenting transmission of rotation from spindle motor 20 to disc 10a,10b,50.

Figure 4:
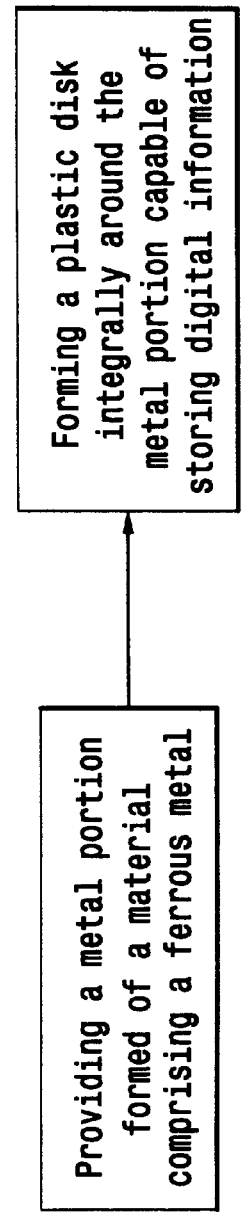
FIG. 4 is a flow chart of the method according to another aspect of the present invention.

The present invention also encompasses a method for producing a plastic disk having a metal insert. As shown in FIG. 4, the method includes the steps of providing a metal insert and integrally forming a plastic platter concentrically around the insert. Preferably, the metal insert comprises the metal portion 14a having outer and inner rim flanges 36a and 36b, respectively, or comprises metal portion 14b having outer rim flange 36a. The plastic may be integrally formed around metal portion 14a,b, preferably in a mold using a thermal process, as will be understood by those familiar with plastic forming processes.

It is understood that changes may be made to the embodiments described above without departing from the broad inventive concepts thereof. Accordingly, the present invention is not limited to the particular embodiments nor to the theoretical description disclosed, but is intended to cover all modifications that are within the spirit and scope of the invention as defined by the appended claims.

What is claimed is:

1. A disk drive and disk combination for reading and recording digital information comprising:

a disk capable of storing digital information comprising:
 only one platter consisting essentially of a planar uppermost surface, an opposing planar lowermost surface, and an inner rim surface formed therebetween, the inner rim surface receiving a protrusion of a metal disk-like portion, the platter formed of a material comprising a plastic that is contiguous between the uppermost surface and the lowermost surface;
 the metal disk-like portion formed of a material comprising a ferrous metal, the metal disk-like portion having an outer rim surface and a bottom metal portion enabling attraction to a clamp magnet, the bottom metal portion being at least partially uncovered by the platter, the protrusion being formed on the outer rim surface and extending therefrom, the metal disk-like portion formed integral with the only one platter such that the plastic material contiguously contacts each one of a plurality of sides of the protrusion; and
 a center aperture that is capable of receiving a spindle shaft of a spindle motor, wherein the metal disk-like portion has a top metal surface that is coplanar with the platter uppermost surface and a bottom metal surface is coplanar with the platter lowermost surface;
a spindle motor having a spindle motor shaft capable of at least partial insertion into the center aperture of the platter and having a clamp magnet coupled to the spindle motor capable of chucking the metal disk-like portion;
a transducer capable of reading and recording digital information stored on the disk; and
an actuator capable of positioning the transducer.

2. A method for producing a disk for storing digital information comprising the steps of:

providing only one metal disk-like portion formed of a material comprising a ferrous metal, the metal disk-like portion including an outer rim surface having a protrusion extending therefrom that has a plurality of sides, the metal disk-like portion having a top metal surface and a bottom metal surface; and forming a magnetic medium integrally around the metal disk-like portion, the magnetic medium including a plastic substrate and a magnetic layer capable of storing digital information, the forming step including forming the plastic substrate over each one of the plurality of sides of the protrusion such that the plastic substrate contiguously contacts each one of the plurality of sides, the plastic substrate consisting essentially of a planar uppermost surface, an opposing planar lowermost surface, and an inner rim surface formed therebetween, the magnetic medium formed such that the top metal surface is coplanar with the magnetic medium uppermost surface and the bottom metal surface is coplanar with the magnetic medium lowermost surface.

3. A disk capable of storing digital information comprising:

only one platter consisting essentially of a planar uppermost surface, an opposing planar lowermost surface, and an inner rim surface formed therebetween, the inner rim surface receiving a protrusion of a metal disk-like portion, the platter formed of a material comprising a plastic that is contiguous between the uppermost surface and the lowermost surface;

the metal disk-like portion formed of a material comprising a ferrous metal, the metal disk-like portion having an outer rim surface and a bottom metal portion enabling attraction to a clamp magnet, the bottom metal portion being at least partially uncovered by the platter, the protrusion being formed on the outer rim surface and extending therefrom, the metal disk-like portion formed integral with the only one platter such that the plastic material contiguously contacts each one of a plurality of sides of the protrusion; and a center aperture that is capable of receiving a spindle shaft of a spindle motor, wherein the metal disk-like portion has a top metal surface that is coplanar with the platter uppermost surface and a bottom metal surface is coplanar with the platter lowermost surface.

4. The disk of claim 3, wherein the metal disk-like portion has an inner rim surface that forms the center aperture.

5. The disk of claim 3, wherein the protrusion includes a flange such that the plurality of sides consists essentially of a top side, a bottom side, and a vertical side therebetween, whereby the plastic contiguously contacts each one of the top side, the bottom side, and the vertical side.

6. The disk of claim 3, wherein the metal disk-like portion is a flat disk forming the center aperture on an inside periphery thereof.

7. The disk of claim 3 wherein the metal disk-like portion is formed of a material consisting essentially of a ferrous metal.

8. The disk of claim 7 wherein the metal disk-like portion consists of a ferrous metal.

* * * * *